(12) United States Patent
Ronacher et al.

(10) Patent No.: US 10,589,654 B2
(45) Date of Patent: Mar. 17, 2020

(54) VEHICLE, IN PARTICULAR EMERGENCY VEHICLE, WITH A LOADING ARRANGEMENT

(71) Applicant: Rosenbauer International AG, Leonding (AT)

(72) Inventors: Alexander Ronacher, Hoersching (AT); Stefan Zauner, St. Martin i.M. (AT)

(73) Assignee: ROSENBAUER INTERNATIONAL AG, Leonding (AT)

( * ) Notice: Subject to any disclaimer, the term of this patent is extended or adjusted under 35 U.S.C. 154(b) by 0 days.

(21) Appl. No.: 16/332,530

(22) PCT Filed: Sep. 8, 2017

(86) PCT No.: PCT/AT2017/060221
§ 371 (c)(1),
(2) Date: Mar. 12, 2019

(87) PCT Pub. No.: WO2018/049446
PCT Pub. Date: Mar. 22, 2018

(65) Prior Publication Data
US 2019/0225133 A1    Jul. 25, 2019

(30) Foreign Application Priority Data

Sep. 13, 2016 (AT) ............................. A 50815/2016

(51) Int. Cl.
*B60P 1/46* (2006.01)
*B60P 1/43* (2006.01)
(Continued)

(52) U.S. Cl.
CPC ................ *B60P 1/433* (2013.01); *B60P 1/02* (2013.01); *B60P 1/4421* (2013.01)

(58) Field of Classification Search
CPC .......................... B60P 1/4428; B60P 1/4421
(Continued)

(56) References Cited

U.S. PATENT DOCUMENTS 3,791,541 A * 2/1974 Himes ................... B60P 1/4421
                                                       414/545
3,877,590 A * 4/1975 Brown ................... B60P 1/4421
                                                       414/545

(Continued)

FOREIGN PATENT DOCUMENTS

CH          671 374 A5    8/1989
DE          78 00 768 U1  7/1978

(Continued)

OTHER PUBLICATIONS

International Search Report in PCT/AT2017/060221, dated Dec. 20, 2017.

*Primary Examiner* — Jonathan Snelting
(74) *Attorney, Agent, or Firm* — Collard & Roe, P.C.

(57) ABSTRACT

The invention relates to a vehicle (1) having a vehicle body (2) and a loading arrangement (5), which comprises a first loading platform (6) and a lifting unit (7) having a guide system (8) and an actuating mechanism (9). The first loading platform (6) is liftable and lowerable by means of the actuating mechanism (9). The loading arrangement (5) comprises a bearing unit (14), which defines a pivot axis (16), as well as a pivoting unit (15). The bearing unit (14) is disposed on the guide system (8). The first loading platform (6) is mounted on the bearing unit (14) in a manner pivotable about its pivot axis (16) and is in driving communication with the pivoting unit (15). By means of the pivoting unit (15), the first loading platform (6), in its relative position with respect to the guide system (8), is adjustable around the pivot axis (16) of the bearing unit (14).

12 Claims, 6 Drawing Sheets

(51) Int. Cl.
  *B60P 1/02* (2006.01)
  *B60P 1/44* (2006.01)
(58) Field of Classification Search
  USPC .................................................. 414/545
  See application file for complete search history.

(56) References Cited

U.S. PATENT DOCUMENTS

| | | | |
|---|---|---|---|
| 5,067,862 A | 11/1991 | Andre | |
| 5,176,226 A * | 1/1993 | Martin | B60P 1/4421 |
| | | | 187/242 |
| 5,176,486 A * | 1/1993 | Park | B60P 1/4421 |
| | | | 296/51 |
| 6,234,740 B1 | 5/2001 | Page | |
| 6,595,738 B2 | 7/2003 | Rock et al. | |
| 7,568,877 B1 * | 8/2009 | Nespor | B60P 1/02 |
| | | | 414/544 |
| 8,523,508 B2 | 9/2013 | Hurler | |
| 8,740,539 B2 * | 6/2014 | Ablabutyan | B60P 1/4421 |
| | | | 414/545 |
| 9,028,195 B1 * | 5/2015 | Heynssens | B60P 1/4428 |
| | | | 414/545 |
| 9,669,749 B2 * | 6/2017 | Walker | B60P 1/4492 |
| 2003/0035695 A1 | 2/2003 | Blackmon | |
| 2007/0231114 A1 | 10/2007 | Westrate | |
| 2009/0026785 A1 | 1/2009 | Nolan | |
| 2014/0154035 A1 * | 6/2014 | Walker | B60P 1/435 |
| | | | 414/537 |
| 2016/0075270 A1 | 3/2016 | Walker | |

FOREIGN PATENT DOCUMENTS

| | | |
|---|---|---|
| EP | 1 560 730 B1 | 9/2012 |
| NL | 8100888 A | 9/1982 |
| WO | 98/54026 A1 | 12/1998 |
| WO | 01/22911 A1 | 4/2001 |

\* cited by examiner

VEHICLE, IN PARTICULAR EMERGENCY VEHICLE, WITH A LOADING ARRANGEMENT

CROSS REFERENCE TO RELATED APPLICATIONS

This application is the National Stage of PCT/AT2017/060221 filed on Sep. 8, 2017, which claims priority under 35 U.S.C. § 119 of Austrian Application No. A 50815/2016 filed on Sep. 13, 2016, the disclosure of which is incorporated by reference. The international application under PCT article 21(2) was not published in English.

The invention relates to a vehicle, especially an emergency vehicle, fire truck, public works vehicle, transportation vehicle, having at least one loading arrangement.

CH 671 374 A5 describes a loading bridge for a utility vehicle, especially for a truck, in which a tail end portion of the loading bridge is designed as a generic lifting platform. The lifting platform may be lowered to the ground and lifted again in alignment parallel to the loading bridge by means of a lifting and lowering mechanism. A foldable loading ramp, which due to its wedge-shaped form is designed in inclined manner to facilitate easier maneuvering over the lowered bridge part, namely the lifting platform, is disposed at the tail end of the lifting platform. On the lowerable lifting platform, two vertical spars that run in guides are disposed on both sides. The guides are fastened to the fixed side loaders of the loading bridge. The lifting and lowering movement may take place by two perpendicularly disposed lifting cylinders. The lowerable lifting platform can be interlocked in the uppermost position. A pivoting movement of the lifting platform from the orientation parallel to the loading bridge is not provided.

US 2007/0231114 A1 describes a loading platform that is disposed at the tail end on a vehicle and is mounted in articulated manner on a transverse end turned toward the vehicle. Furthermore, a guide system having guide columns adjustable in height is provided at the tail end as well as on both sides of the loading platform, wherein respectively one bearing mechanism for the loading platform is disposed at the ground end. Actuating cylinders are respectively held with their first ends at the ends of the guide columns turned away from the ground. At approximately half of the depth of the loading platform, the second ends of the actuating cylinders are linked thereto. Thus the loading platform can be pivoted downward from a partly folded-upward closure position into a loading position folded downward to approximately horizontal orientation.

From DE 78 00 768 U1, a trailer designed as a flatbed truck is known, in which the flatbed is mounted pivotally on an intermediate frame at the tail end. In a middle portion of the long side, an actuating cylinder, by means of which the flatbed can be pivoted upward, is disposed between the flatbed and the intermediate frame. Between a base frame of the flatbed truck and the intermediate frame, a scissor joint arrangement is provided in order to be able to adjust the intermediate frame in parallel alignment with respect to the base frame. For this purpose, a further actuating cylinder is provided.

U.S. Pat. No. 5,067,862 A describes a transportation mechanism for automobiles, in which the transportation platforms are disposed and held in different arrangements on carrying posts situated respectively on both sides of the transportation platforms. In the first described designs, the transportation platforms in their first end region are respectively mounted in articulated manner on the carrying posts and project unilaterally in the direction of the tail. The transportation platforms are adjustable in vertical direction on the carrying posts via threaded bars disposed on both sides. Furthermore, the transportation platforms are respectively joined on both sides to one of the threaded bars via bars of fixed length, each having a lower block provided with a thread. The bearing points on both sides of the transportation platform are likewise joined to one of the threaded bars via respectively an upper block provided with a thread. The adjustment of the inclination takes place by a change of spacing between the upper and lower blocks by selective coupling or decoupling of one of the blocks having the threaded bar.

In a second exemplary embodiment of U.S. Pat. No. 5,067,862 A according to FIGS. 8 and 9, the transportation platforms in their first end region are likewise respectively mounted in articulated manner on the carrying posts and project unilaterally in the direction of the tail. The adjustment of the inclination of the transportation platforms takes place here by a change of length of the telescopic connecting bar between the lower block and the transportation platform. An additional adjustment of the inclination of the transportation platform can take place once again by the change of spacing between the upper and lower block along the threaded bar by selective coupling or decoupling.

The further exemplary embodiment according to FIGS. 14 and 15 describes a possible additional adjustment of the transportation platform in the direction of the longitudinal extent thereof relative to the projecting carrying posts. Here, the transportation platform is mounted in articulated manner in its middle portion as well as displaceably in longitudinal direction thereof and is coupled with the threaded bar via a middle block. Furthermore, the transportation platform is respectively joined on both sides to one of the threaded bars via first bars of fixed length, each having a lower block provided with a thread. On the side of the carrying posts situated opposite the first bars, further inclined bars are disposed, which are linked on the one hand to the transportation platform and on the other hand to an upper block. The further bars likewise have a constant length. The inclination movements and the longitudinal displacement of the transportation platform along the carrying posts turned toward one another is derived from the selective engagements or the decoupling of the decoupleable middle and lower blocks designed as nuts.

US 2003/0035695 A1 describes, situated within a transportation vehicle, a foldable access ramp, which is mounted in articulated manner on the two side walls at its front end as well as immovably at the tail end of the upper carrying arrangement. The tail end of the access ramp is adjustable in its orientation via a lifting and lowering arrangement. The lifting and lowering arrangement is joined on the one hand to the tail end of the access ramp as well as to the roof structure.

US 2016/0075270 A1 describes a loading platform disposed at a tail end of a heavy truck. The loading platform is adjustable in height in vertical direction as well as pivotable downward from a vertical closure position into a horizontal loading position. Furthermore, the loading platform in its loading position, starting from the vertical guide arrangement, projects rearward, beyond the tail end of the heavy truck. The pivoting drive for the loading platform is disposed in the region of linkage of the loading platform on the vertical guide arrangement.

NL 8100888 A also describes a loading platform disposed at a tail end of a heavy truck. The loading platform is adjustable in height in vertical direction as well as pivotable downward from a vertical closure position into a horizontal loading position. Furthermore, the loading platform in its closure position, starting from the vertical guide arrangement, projects beyond the tail end of the heavy truck. The pivoting drive for the loading platform is disposed underneath the loading platform, wherein one end of the actuating cylinder is disposed on the vertical guide arrangement and the other end, spaced apart therefrom, is disposed underneath the loading surface on the loading platform.

WO 98/54026 A1 also describes, for a truck, a generically designed lifting platform that is disposed in connection to a loading bridge within the vehicle body. The lifting platform may be lowered to the ground in alignment parallel to the loading bridge by means of a lifting and lowering mechanism, which at each corner region of the lifting platform comprises one actuating cylinder each. A foldable ramp designed in wedge-shaped downward manner is disposed at the tail end of the lifting platform. Furthermore, guide spars are disposed on both sides of the lifting platform at the tail end. Here also no pivoting movement of the lifting platform from the orientation parallel to the loading bridge is provided.

From WO 01/22911 A1, a lifting mechanism is known that is intended for use in a vehicle having a side opening. The lifting mechanism comprises a platform, which in a storage position in the interior of the vehicle is folded as well as pivoted upward. When it is being used, the platform is pivoted to the outside of the vehicle and unfolded. A telescopically designed column permits a height adjustment, in which the outwardly pivoted platform can be adjusted between an upper plane and a lower plane. The movement of the platform may be achieved by use of hydraulic means.

EP 1 560 730 B1 describes a vehicle having liftable or lowerable loading boxes or loading surfaces. By means of a lifting implement, the loading boxes or loading surfaces are liftable or lowerable in vertical direction relative to the vehicle frame. At least one of the loading boxes or loading surfaces is disposed behind a rear axle in such a way that it forms an inner loading ramp. To the side and back, opening areas that release loading openings for loading or unloading are provided on the vehicle frame in the region of the loading ramp. As opening areas, a roll-up door is provided on the back end of the vehicle, as are respective sliding doors on both sides in the region of the liftable and lowerable loading boxes or loading surfaces. The sliding doors are equipped at their rear ends with perpendicular guide rails for a guidance of the roll-up door. The loading boxes or loading surfaces forming a unit are liftable and lowerable together in perpendicular direction, wherein the lifting implements are respectively disposed in a corner region of the loading boxes or loading surfaces. In order to overcome the height difference between the loading surface and the ground or the contact surface when the loading boxes or loading surfaces are lowered, a foldable tailgate is provided in the form of a built-in ramp. In this situation, it is disadvantageous that no uniform transition from the loading surface to the ground can be formed, but instead a kink is produced by the folded-down tailgate.

The task of the present invention was to overcome the disadvantages of the prior art and to provide a vehicle having at least one loading arrangement, by means of which a user is put into position to be able to undertake a simple, infinitely variable unloading of cargo from a loading ramp or loading of cargo onto said loading ramp.

This task is accomplished by a vehicle having a loading arrangement according to the claims.

The vehicle comprises:
a vehicle body,
at least one front-wheel pair and at least one rear-wheel pair,
at least one loading arrangement, wherein the at least one loading arrangement comprises a first loading platform and at least one lifting unit having a guide system and an actuating mechanism, wherein, by means of the actuating mechanism, the first loading platform is liftable and lowerable relative to the vehicle body, and the first loading platform forms a loading surface having a width and a depth, and wherein the first loading platform in its upper starting position as well as given a horizontal alignment of the vehicle body is likewise horizontally aligned,
wherein the at least one loading arrangement is received and disposed within the vehicle body,
wherein the guide system is designed as a longitudinal guide system,
wherein the guide system comprises a left guide arrangement and a right guide arrangement, and the two guide arrangements are disposed respectively on both sides of the first loading platform in the direction of the width of the first loading platform,
wherein the left guide arrangement and the right guide arrangement of the guide system are disposed in a middle portion with respect to the depth of the first loading platform,
and wherein the left guide arrangement of the guide system has a left guide profile and the right guide arrangement of the guide system has a right guide profile, and in this case
the at least one loading arrangement comprises a bearing unit, which bearing unit defines a pivot axis,
the bearing unit comprises a left bearing mechanism and a right bearing mechanism, and the left bearing mechanism defines a left pivot axis and the right bearing mechanism defines a right pivot axis, and the left pivot axis and the right pivot axis are aligned exactly with one another as well as together form the pivot axis of the bearing unit,
the first loading platform is mounted on the bearing unit in a manner pivotable around its common pivot axis,
the bearing unit is disposed on the guide system and in this case the left bearing mechanism of the bearing unit is joined to the left guide profile and the right bearing mechanism of the bearing unit is joined to the right guide profile,
the left and the right bearing mechanisms of the bearing unit and the first loading platform mounted thereon are disposed in a lower first end region of the guide profiles that can be turned toward a contact surface of the vehicle
the at least one loading arrangement further comprises a pivoting unit,
the first loading platform is in driving communication with the pivoting unit, by means of which pivoting unit the first loading platform, in its relative position with respect to the guide system, is adjustable around the common pivot axis of the bearing unit,
the pivoting unit comprises at least one pivoting device, especially a cylinder-piston arrangement, a chain drive, a belt drive, a cable drive or a linear drive, and a first end of the pivoting device is held on the first loading platform and a second end of the pivoting device is held on the guide profile of the guide arrangement, the first end of the pivoting device on a back side of the first loading platform turned away from a loading side is held thereon and, furthermore the second end of the pivoting device, on a second end region of the guide profile spaced apart from the bearing unit, is disposed thereon.

The advantage achieved thereby is that in this way a loading arrangement is created that on the one hand is liftable and lowerable relative to the vehicle body and additionally even the entire first loading platform, starting from a usually horizontal alignment, is adjustable or pivotable in its relative position around the bearing axis by means of a built-in pivoting unit. Thus it is possible to lower the loading arrangement, especially the first loading platform, by means of the actuating mechanism as far as possible in the direction of the contact surface, i.e. toward the ground, and then, in order to form an inclined plane, even to pivot the first loading platform as a whole so far that a continuous plane for the transition to the ground is created on the loading surface as far as the loading sill. Since the guide system is preferably designed as a longitudinal guide system, a linear lifting and/or lowering movement of the first loading platform relative to the vehicle body is executed. Due to the chosen linearly oriented longitudinal guide system, an adequate safe adjustment movement in the smallest space is also executed.

If the guide system comprises a left guide arrangement and a right guide arrangement, and if the two guide arrangements are disposed respectively on both sides of the first loading platform in the direction of the width of the first loading platform, then, due to the layout of the guide arrangements on both sides for formation of the guide system, a symmetric transmission of force is created, starting from the first loading platform, to the guide system having the guide arrangements.

If the guide system, especially the left and the right guide arrangements, is disposed in a middle portion with respect to the depth of the first loading platform, then, due to the layout of the guide arrangements and thus also of the bearing mechanisms on which the loading platform is pivotally mounted, the force transmission is kept smaller, as is also, however, the positioning and retention force of the pivoting unit in the further sequence. Due to the connection of the pivoting unit, especially its pivoting device, on the one hand with the loading platform and on the other hand with the guide profile of the guide arrangement, a space-saving arrangement of the pivoting unit is therefore created with small actuating forces.

If the left bearing arrangement of the bearing system has a left guide profile and the right bearing arrangement of the bearing system has a right guide profile, and if the left bearing mechanism of the bearing unit is joined to the left guide profile and the right bearing mechanism of the bearing unit is joined to the right guide profile, then, due to the provision of respectively at least one built-in guide profile on each of the side regions of the platform, it is possible, in conjunction with the bearing mechanisms as well as the loading platform, to create a compact structural unit, which is formed simply and stably and which permits a common adjustment movement with respect to the vehicle body.

If the bearing unit comprises a left bearing mechanism and a right bearing mechanism, and if the left bearing mechanism defines a left pivot axis and the right bearing mechanism defines a right pivot axis, then, due to the provision of the two bearing mechanisms, the first loading platform is mounted in tilt-free manner in a bearing unit constructed in two sections. In this way, however, a larger width is also provided for the formation of the first loading platform, whereby an adequately stable bearing means is created despite the pivoting capability. If the left pivot axis and the right pivot axis are aligned exactly with one another, and if these together form the pivot axis of the bearing unit, then a central common pivot axis is created, so that a tilt-free pivoting movement of the first loading platform can be executed.

If the bearing unit, especially its left and right bearing mechanisms, and the first loading platform mounted thereon are disposed in a lower first end region of the guide profiles that can be turned toward a contact surface of the vehicle, on the one hand an adequate guiding accuracy for the guide profiles and on the other hand a lowering of the first loading platform close to the ground are achieved thereby.

If the pivoting unit further comprises at least one pivoting device, especially a cylinder-piston arrangement, a chain drive, a belt drive, a cable drive or a linear drive, and if a first end of the pivoting device is held on the first loading platform and a second end of the pivoting device is held on the guide profile of the guide arrangement, a simple pivoting movement and associated therewith adjustment of inclination is permitted thereby independently of the lifting and lowering movement of at least one of the loading platforms. In this way a compact structural unit is created, which executes the desired adjustment movements independently of one another. Due to the connection with the guide profile, the pivoting device is also disposed in a lateral outer rim region of the loading platform.

If the first end of the pivoting device on a back side of the first loading platform turned away from a loading side is held thereon, then, due to the rear or back-end arrangement of the pivoting device on the first loading platform, an obstruction-free, large width of the loading surface of the loading platform is created from the loading side up to the rear end sill of the loading platform.

If the second end of the pivoting device is disposed on a second end region of the guide profile spaced apart from the bearing unit, thereby an inclined position of the pivoting device or devices relative to the guide profile is achieved, whereby smaller adjustment forces as well as retention forces suffice for stabilization of the loading platform relative to the guide arrangements, especially the guide profiles.

Another embodiment is characterized in that the loading surface of the first loading platform, in its starting position, given a horizontal alignment of the vehicle body, likewise has a horizontal alignment and, after its pivoting to the side turned away from the vehicle body, is aligned in downward manner. Thereby, in conjunction with the lifting and/or lowering movement, it is additionally further possible to execute a complete pivoting movement of at least the first loading platform together with its loading surface, in order in this way to form a continuously inclined plane. Due to the inclined position of the loading platform and the near-round arrangement of the entire lifting unit having the first loading platform, a flat transition can therefore be created from the loading surface to the contact surface or to the ground. Furthermore, however, an adaptation to different terrain forms can also be achieved simply therewith.

Another alternative embodiment is characterized in that the loading arrangement comprises at least one positioning mechanism and/or a securing mechanism and at least the first loading platform is positioned and/or held in its starting position by means of the positioning mechanism and/or as is the securing mechanism in its starting position relative to the vehicle body. In this way, a locking of at least the first loading platform relative to the vehicle body can be achieved in the starting position and thus also during the traveling movement of the vehicle with securing mechanism engaged. If even at least one further positioning mechanism is also provided, the first loading platform can be positioned immovably in a predefined position, especially centered, after the end of the lifting movement. Thus locking in the predefined position can be executed simply and safely by means of the securing mechanism. Beyond this, it is also even possible in this way to take the load off the pivoting unit and/or the actuating mechanism, especially its actuating device, while it is in the starting position or the transportation position, and to damp or completely suppress possible vibrations.

Another alternative embodiment is characterized in that the guide system comprises at least one further guide arrangement and the at least one further guide arrangement is joined pivotally to the first loading platform. Thus, on that side of the first guide arrangement on the first loading platform which is turned away from the front loading sill, an additional adjustment movement can be executed by means of the at least one further guide arrangement. In this case, the pivoting unit could be formed by the at least one further guide arrangement itself. When the downward adjustment of the first loading platform is stopped in the region of its back side or rear end in the further guide arrangement and the downward adjustment is continued in the left and right guide arrangements, the inclined position and associated therewith the downward pivoting of the first loading platform can be achieved for an adequate length compensation between the first loading platform and the further guide arrangement.

Furthermore, it may be advantageous when the guide system, especially its guide arrangements with their guide profiles, is aligned in a manner running in vertical direction in the case of a horizontal alignment of the vehicle body. Due to the vertical alignment of the guide system, a space-saving layout of the entire loading arrangement can therefore be created in the smallest space within the vehicle body.

A further possible and as the case may be alternative embodiment has the features that the left guide arrangement comprises at least one left longitudinal guide mechanism and the right guide arrangement comprises at least one right longitudinal guide mechanism, and the left guide profile is guided on the at least one left longitudinal guide arrangement and the right guide profile on the at least one right longitudinal guide arrangement. Due to the provision of the built-in longitudinal guide mechanisms, each of the guide profiles can be guided independently in adequately accurate manner in the direction of the positioning movement. Beyond this, a tilt-free longitudinal guide can also be created in this way.

Furthermore, it may be advantageous when the loading arrangement comprises at least one further loading platform, which at least one further loading platform is disposed spaced apart in vertical direction from the first loading platform on one of the guide profiles. Thus the receiving space available within the vehicle body can be used even more effectively and further equipment items can be stowed in orderly and secure manner.

A further embodiment provides that the at least one further loading platform is mounted pivotally on one of the guide profiles by means of a further bearing mechanism of the bearing unit. At the further loading platform or platforms, therefore, the viewing of the further loading platform or platforms and also the removal of items from the respective loading platform can also be facilitated.

Another alternative embodiment is characterized in that the at least one further loading platform is coupled with the first loading platform by means of a coupling element. Thus a movement linkage can be easily created for the common pivoting movement. Beyond this, however, it is possible in this way to dispense with additional pivoting devices for execution of the pivoting movement.

A further alternative embodiment is characterized in that the first loading platform is designed in a manner split in the direction of its width and a left loading-platform part of the first loading platform is mounted pivotally by means of the left bearing mechanism of the bearing unit on the left guide arrangement of the guide system and a right loading-platform part of the first loading platform is mounted pivotally by means of the right bearing mechanism of the bearing unit on the right guide arrangement of the guide system and each of the guide arrangements is in driving communication with a built-in, independent actuating device of the actuating mechanism. Due to the subdivision and, associated therewith, distribution of the first loading platform into two loading platform parts independently of one another, the loading space can be distributed in even better structured manner and the removal can be organized better and more clearly in terms of the removal height.

A further alternative embodiment is characterized in that each of the loading platform parts is in driving communication with a built-in, independent pivoting device of the pivoting unit. In this way an even more individual removal capability can be created.

Another embodiment is characterized in that the left pivot axis and the right pivot axis are aligned exactly with one another as well as together form the pivot axis of the bearing unit. Thus a central common pivot axis can be created, so that a tilt-free pivoting movement of the first loading platform can be executed.

Yet a further design provides that the at least one left longitudinal guide mechanism and the at least one right longitudinal guide mechanism are held in stationary manner on the vehicle body. Thereby a large-area loading platform for receiving of the most diverse items to be received can be created in the smallest space and thus with small footprint within the vehicle body.

Another embodiment is characterized in that each of the longitudinal guide mechanisms respectively comprises several guide rollers, wherein, viewed in the longitudinal direction of the guide arrangement, one guide-roller pair of one of the longitudinal guide mechanisms comprises guide rollers disposed spaced apart from one another in the direction of the depth of the first loading platform, and axes of rotation of the guide rollers of the guide-roller pair are respectively aligned in the direction of the depth of the first loading platform as well as in perpendicular direction with respect to the longitudinal extent of the guide profile, and at least one further of the guide rollers, the axis of rotation of which is aligned in the direction of the width of the first loading platform as well as in perpendicular direction with respect to the longitudinal extent of the guide profile, is disposed between the guide-roller pair. Due to the arrangement, offset by 90° relative to one another, of the axes of rotation between each guide roller of the guide-roller pair and that guide roller which is disposed between the guide-roller pair, it is possible, viewed in vertical direction, to create a high guiding accuracy both in the direction of the width and in the direction of the depth. Since each of the guide rollers preferably bears on respective diametrically opposite guide faces of the guide profile, a very high guiding accuracy and bracing effect can be achieved in this way both in the direction of the depth and in the direction of the width of the first loading platform.

A further embodiment provides that the pivoting unit comprises two pivoting devices and the two pivoting devices are disposed spaced part from one another in the direction of the width of the first loading platform. Thereby a uniform force transmission can be achieved for the execution of the pivoting movement on the loading platform. Beyond this, however, a large clear space can be created in this way on the loading platform and made available for the receiving of the most diverse cargo types.

Finally, a possible embodiment is characterized in that the actuating mechanism of the at least one lifting unit comprises at least one actuating device and at least one toothed rack, and the at least one toothed rack is disposed on the guide profile of the guide arrangement and the at least one actuating device is disposed on the vehicle body. Thereby a precision adjustment movement of the entire unit comprising loading platform, guide profiles and bearing mechanisms relative to the vehicle body can be executed.

For better understanding of the invention, it will be explained in more detail on the basis of the following figures.

Therein, respectively in greatly simplified schematic diagrams,

Figure 1:
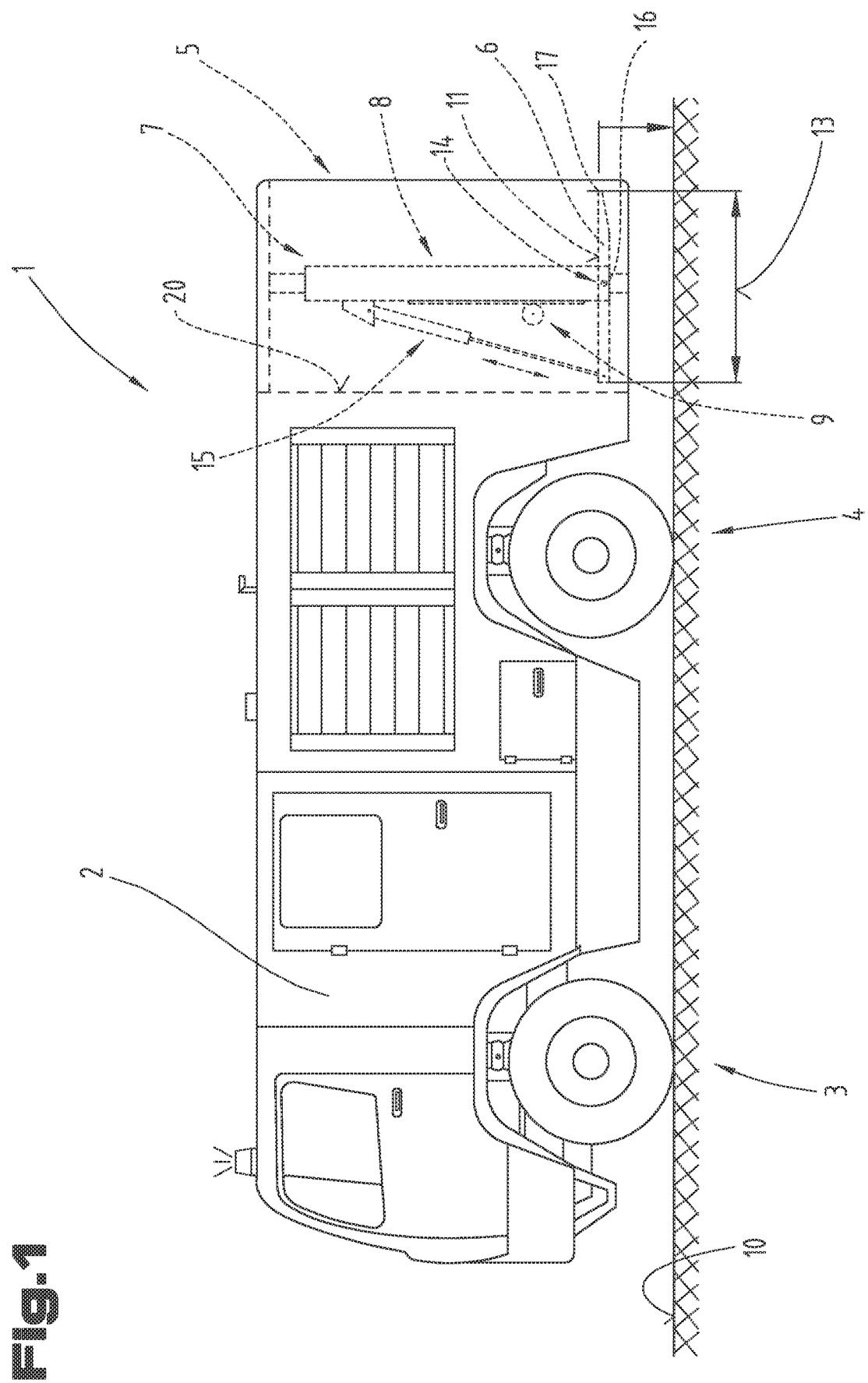
FIG. 1 shows a vehicle having a liftable and lowerable loading arrangement in side view.

By way of introduction, it is pointed out that like parts in the differently described embodiments are denoted with like reference symbols or like structural part designations, wherein the disclosures contained in the entire description can be carried over logically to like parts with like reference symbols or like structural-part designations. The position indications chosen in the description, such as top, bottom, side, etc., for example, are also relative to the figure being directly described as well as illustrated, and these position indications are to be logically carried over to the new position upon a position change.

The term "in particular" or "especially" will be understood hereinafter to mean a possible more special design or more detailed specification of an item or of a method step, but does not necessarily have to represent a mandatory, preferred embodiment of the same or a mandatory procedure.

In FIGS. 1 to 4, a vehicle 1 is shown in simplified views as well as detail views. The vehicle 1 may be used for the most diverse operational purposes, especially as an emergency vehicle, fire truck, public works vehicle or transportation vehicle.

At least one front-wheel pair 3 and at least one rear-wheel pair 4 are held or mounted on a vehicle body 2. Instead of individual wheels, it would be possible to use dual wheels also. For the sake of better clarity, the illustration of a drive unit or other units or components of structural parts has not been presented.

The vehicle body 2 of the vehicle 1 may be designed as a self-supporting body or even as a non-self-supporting body. Here it will be understood as any structure designed among other purposes to carry the individual wheel pairs, the drive elements and many other components.

In the exemplary embodiment shown here, one possible form of an emergency vehicle is illustrated as a fire truck. The most diverse storage compartments and/or storage boxes may be provided in the vehicle body 2, so that the equipment items, tools and much more necessary for operations can be carried along in orderly manner.

In the tail region of the vehicle 1, it is also indicated that at least one built-in unit is disposed as a so-called loading arrangement 5 within the vehicle body 2, in particular is received within it. In the present exemplary embodiment, the entire loading arrangement 5, viewed in travel direction, is provided to the rear of the rear-wheel pair 4. In this connection, it must be mentioned that the loading arrangement 5 or several of the loading arrangements 5 may also be disposed or provided on at least one of the vehicle longitudinal sides of the vehicle. It would even also be possible to provide or dispose several of the loading arrangements at arbitrary positions of the vehicle 1. In order to be able to execute an adequate adjustment movement for execution of the lifting or lowering movement, the loading arrangement 5 should be so disposed that an unobstructed clear space is available from the vehicle body 2 in the direction of the ground or of a contact surface 10, in order to be able to execute an unobstructed lowering movement.

The loading arrangement 5 itself may in turn be formed from a plurality of structural-part components as well as structural part groups, which are merely indicated in FIGS. 1 and 2 and will be described and explained in more detail in the further FIGS. 3 and 4.

The loading arrangement 5 comprises a first loading platform 6 and at least one lifting unit 7. The lifting unit 7 in turn comprises a guide system 8 as well as an actuating mechanism 9. By means of the actuating mechanism 9, the first loading platform 6 may be adjusted in its position relative to the vehicle body 2. Thus the first loading platform 6 is liftable and lowerable relative to the vehicle body 2. In the lifted position illustrated here, the first loading platform 6 is situated within the vehicle body 2 and may be lowered into a position close to the ground by means of the actuating mechanism 9.

A contact surface 10 is indicated as a plane, horizontal surface underneath the vehicle 1. Due to the height adjustability of the first loading platform 6, it is possible, for the loading or unloading of the most diverse items, to lower the first loading platform 6 so far that a loading surface 11 defined by the first loading platform 6 can be lowered close to or immediately at the level of the contact surface 10. The first loading platform 6 or its loading surface 11 is designed with a width 12 as well as a depth 13 that is ready for loading in its entirety or to a preponderant proportion of its area.

The first loading platform 6 with its loading surface 11 may be designed either exclusively as a pure plane platform or else designed at least in regions with a border projecting from the loading surface 11 in the form of a loading box or the like.

Here, the at least one loading arrangement 5 further comprises yet another bearing unit 14 as well as a pivoting unit 15. The bearing unit 14 in turn is disposed on the guide system 8 or held thereon or designed as such. This bearing unit 14 in turn defines a pivot axis 16. The first loading platform 6 in turn is mounted on the bearing unit 14 in a manner pivotable around its pivot axis 16.

Due to the provision of the bearing unit 14, the first loading platform 6 may be mounted pivotally around its pivot axis 16 relative to the guide system 8. The pivoting unit 15 is used for execution of the relative pivoting movement of the first loading platform 6. For this purpose, the first loading platform 6 is in driving communication with the pivoting unit 15. By means of the pivoting unit 15, the first loading platform 6 may be pivoted around the pivot axis 16 of the bearing unit 14 in its relative position with respect to the guide system 8.

If the first loading platform 6 is preferably situated within the vehicle body 2 and thus in its upper starting position, the loading surface 11 of the first loading platform 6, in case of a horizontal alignment of the vehicle body 2, is likewise horizontally aligned. If the relative adjustment of the first loading platform 6 takes place in the direction of the contact surface 10, according to the shown arrow, the pivoting of the first loading platform 6 may be executed by means of the at least one pivoting unit 15.

Preferably, the pivoting of the first loading platform 6 takes place in such a way that, after the pivoting has been executed, it or its loading surface 11 is aligned in a manner sloping outward and downward from the side turned away from the vehicle body 2. In this way it is possible that, viewed in travel direction, a rear loading sill 17 of the first loading platform 6, i.e. a tail-end loading sill or the longitudinal edge of the loading platform 6, can be lowered and pivoted so far in the direction of the contact surface 10 that an approximately infinitely variable transition from the loading surface 11 to the contact surface 10 can be achieved. Due to this pivoting movement of the first loading platform 6, the capability can therefore also be created of taking along, within the vehicle body 2, during the trip to the point of use, transportation vehicles of smaller size or the like being taken along, for example, and of first lowering the loading platform 6 for the operational purpose and then setting a predefined angular position of the first loading platform 6 by means of the pivoting unit 15, so that a simple unloading process can be executed.

If several loading arrangements 5 are provided within the vehicle body 2 of the vehicle 1, at least the first loading platform 6, after the lowering and the downward pivoting process, is downwardly aligned on the side turned away from the vehicle body 2. In FIG. 3, the lowered and also pivoted unloading position of the loading platform 6 is indicated by dashed lines.

Furthermore, it can also be seen here that the guide system 8 is designed as a longitudinal guide system. In this way a linear adjustment movement of the first loading platform 6 relative to the vehicle body can be achieved.

In the view of the tail end of the vehicle 1 or of the vehicle body 2, the guide system 8 used here, which is designed as a linear or straight guide, has a left guide arrangement 18 as well as a right guide arrangement 19. The two guide arrangements 18, 19, with respect to the first loading platform 6, are disposed, in the direction of its width 12, respectively on both sides of the first loading platform 6.

For receiving of the entire loading arrangement 5, a receiving space 20, which may also be described as shaft-like, is provided or designed in the vehicle body 2. The receiving space 20 may be closed on the outside, i.e. in the region of the outer shell of the vehicle body 2, with one or more closure elements, not described in more detail, which is or are adjustable from a position that shuts off or closes the receiving space 20 into an opening position, in order in this way to permit the access into the receiving space 20. The closure element or elements may be formed, for example, by one or more doors, a roller shutter, a tarpaulin covering or the like. In the view of the tail end illustrated here, the receiving space 20 is shown with opened closure element.

On the basis of the arrangement, provided on both sides here, of the left guide arrangement 18 and of the right guide arrangement 19 for formation of the guide system 8, the detailed design will be described in the following only for the components or structural-part groups disposed on the left side of the first loading platform 6 as viewed in travel direction, wherein, by analogy, the same arrangement is formed in mirror-image manner with respect to a middle plane 21 of the vehicle. For this purpose, in FIGS. 2 to 4, the reference symbols of the structural-part components respectively disposed on the right side have been placed in parenthesis next to the reference symbols of the structural-part components disposed on the left side.

The bearing unit 14 described in the foregoing in turn comprises a left bearing mechanism 22 and a right bearing mechanism 23. In turn, the left bearing mechanism 22 defines a left pivot axis 24, wherein the right bearing mechanism 23 defines a right pivot axis 25. Due to the arrangement of the individual bearing mechanisms 22, 23 on both sides, care is to be taken that the left pivot axis 24 and the right pivot axis 25 are exactly aligned with one another. Due to the spatial separation of the two bearing mechanisms 22, 23 with their pivot axes 24, 25, the two pivot axes 24, 25 together define or form the pivot axis 16 of the bearing unit 14.

The left guide arrangement 18 of the guide system 8 illustrated here has at least one left guide profile 26. By analogy therewith, the right guide arrangement 19 of the guide system 8 comprises at least one right guide profile 27. Furthermore, it may also be seen here that the left bearing mechanism 22 of the bearing unit 14 and the left guide profile 26 are joined to one another. By analogy therewith, however, the right guide profile 27 is also joined to the right bearing mechanism 23 of the bearing unit 14 or the right bearing mechanism 23 is disposed on the right guide profile 27, and in particular is fastened thereon.

In order to permit an adjustment movement of the first loading platform 6 in the receiving space 20, preferably aligned vertically with respect to the contact surface 10, the guide system 8, especially its guide profiles 26, 27, is aligned in a manner running in vertical direction in the case of a horizontal alignment of the vehicle body 2. Thereby a height adjustment of the first loading platform 6 in the smallest space may take place jointly by means of the two guide profiles 26, 27 as well as the bearing mechanisms 22, 23 disposed or provided on these.

In order to be able to lower the first loading platform 6 very close to the ground, i.e. in immediately adjacent arrangement relative to the contact surface 10, it is advantageous when the loading unit 14, especially its left and right bearing mechanisms 22, 23, is disposed in a lower first end region 28 of the guide profiles 26, 27 that can be turned toward the contact surface 10 of the vehicle 1. Due to this arrangement of the two bearing mechanisms 22, 23 close to the ground and also, associated therewith, of the first loading platform 6 mounted or held thereon, the two guide profiles 26, 27 of the two guide arrangements 18, 19 can therefore be lowered together in guided manner.

For guidance of the two guide profiles, namely the left guide profile 26 and the right guide profile 27, still other built-in longitudinal guide mechanisms are to be provided. Thus, for guidance of the left guide profile 26, the left guide arrangement 18 comprises at least one left longitudinal guide mechanism 29. By analogy with this, the right guide arrangement 19 also comprises at least one right longitudinal guide mechanism 30. In this way it is possible to guide each of the guide profiles 26, 27 independently of one another, respectively on a built-in longitudinal guide mechanism, namely the left longitudinal guide mechanism 29 or the right longitudinal guide mechanism 30. For achievement of an adequate tilting safety, several of the individual guide mechanisms 29 and 30 may also be disposed or provided one above the other in vertical direction for each of the guide arrangements 18, 19.

In the present exemplary embodiment, the first loading platform 6 together with the left bearing mechanism 22, the right bearing mechanism 23 and the left guide profile 26 and the right guide profile 27 forms a cohesive structural unit, which is guided altogether on the left longitudinal guide mechanism or mechanisms 29 or the right longitudinal guide mechanism or mechanisms 30. The pivoting unit 15 described briefly in the foregoing as well as parts of the actuating mechanism 9 may preferably form still other constituents of the common structural unit. Preferably, the longitudinal guide mechanisms 29, 30 are held in stationary manner on the vehicle body 2 and thus are disposed thereon outside of the first loading platform 6 and of the two guide profiles 26, 27.

Figure 4:
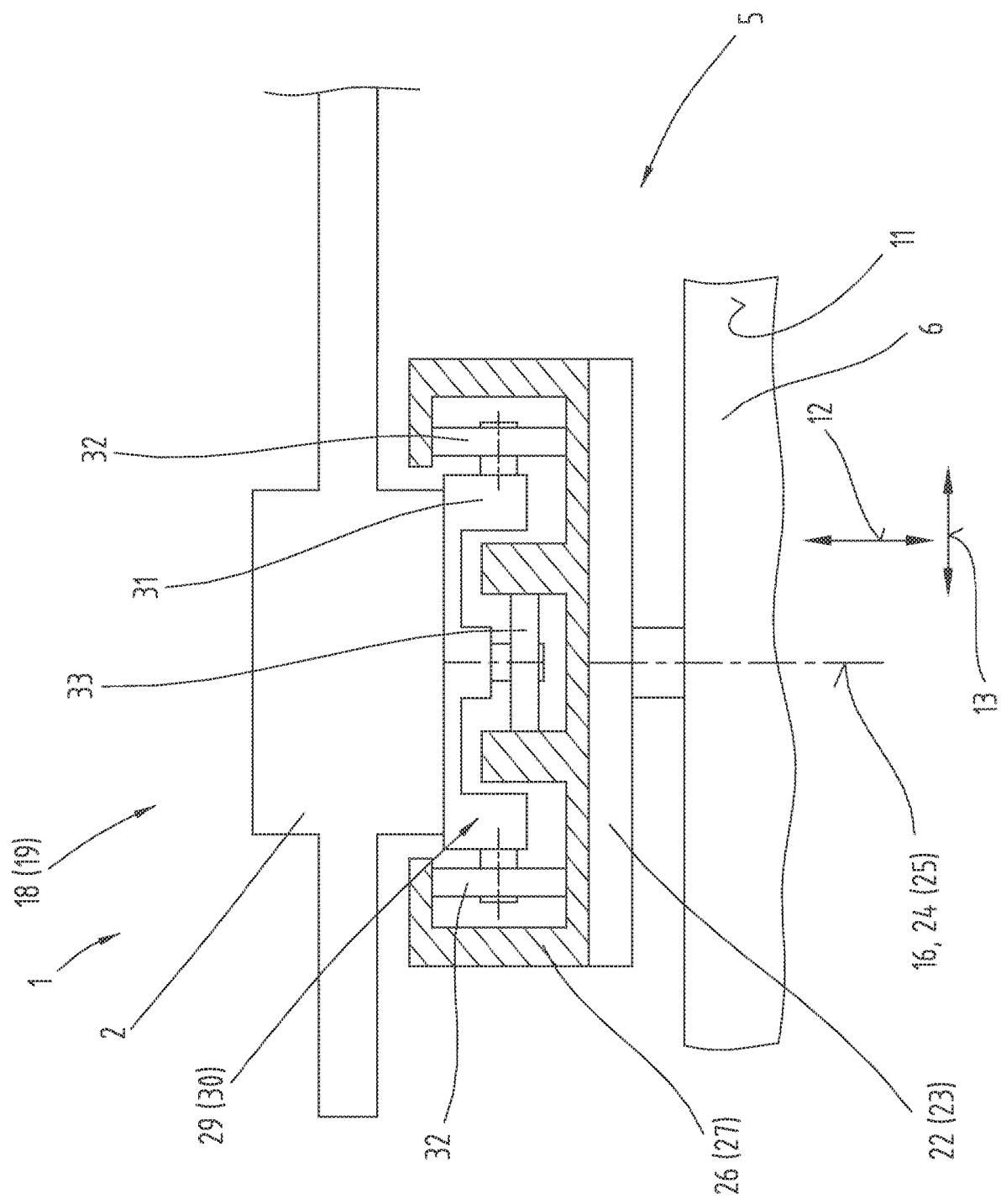
FIG. 4 shows the left guide arrangement in overhead view, in section according to lines IV-IV in FIG. 3.

In FIG. 4, a possible design of the longitudinal guide mechanisms 29, 30 can be seen in which each of the longitudinal guide mechanisms 29, 30 may comprise several guide rollers. The individual guide rollers may be disposed on a common base frame 31 and mounted rotatably thereon. In the present exemplary embodiment, each of the longitudinal guide mechanisms 29, 30 respectively comprises a guide-roller pair having first guide rollers 32. Viewed in longitudinal direction or longitudinal extent of the guide arrangement 18, 19 and thus in the cross section of the guide profile 26, 27, the two first guide rollers 32 are disposed spaced apart from one another in the direction of the depth 13 of the first loading platform 6. The respective axes of rotation of the first guide rollers 32 of the guide-roller pair are respectively aligned in the direction of the depth 13 of the loading platform 6 as well as in perpendicular direction with respect to the longitudinal extent of the guide profile 26, 27. Due to this alignment of the guide-roller pairs with their first guide rollers 32, a guidance, viewed in the direction of the width, of the two guide profiles 26, 27 parallel to one another can be achieved in this way for the guide profiles 26, 27 guided thereon and thus also for the first loading platform 6.

Furthermore, it is also illustrated here that at least one further guide roller 33 is disposed or provided between each of the guide-roller pairs with their first guide rollers 32. With respect to the axes of rotation of the first guide rollers 32 of the guide-roller pair, the axis of rotation of the further guide roller 33 is offset by 90° relative thereto. Thus the axis of rotation of the further guide roller 33 is aligned in the direction of the width 12 of the loading platform 6 as well as in perpendicular direction with respect to the longitudinal extent of the respective guide profile 26, 27. Thereby, viewed in the direction of the depth 13, an adequate guidance of the respective guide profile 26, 27 may likewise be achieved.

Independently of this, however, the longitudinal guide mechanisms 29, 30 could also be formed by sliding guides, ball-bearing guides or linear guides. In this way, a longitudinal guidance of the first loading platform 6 should be obtained that is as tilt-free as possible.

Figure 3:
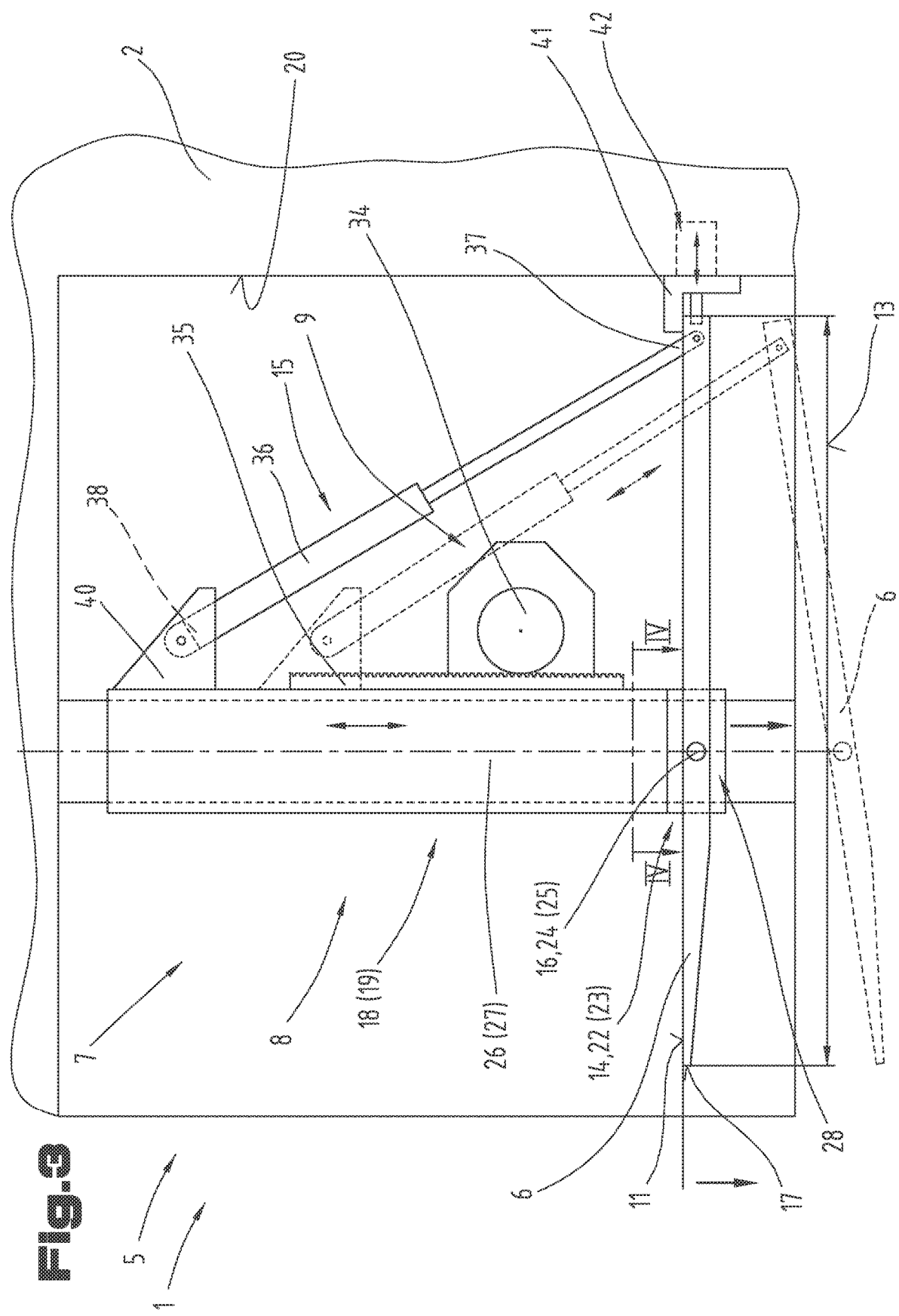
FIG. 3 shows a detail of the loading arrangement, in a view of the components of the lifting unit, bearing unit and pivoting unit disposed on the left in travel direction.

In turn, as can now be seen better from FIGS. 1 and 3, the guide system 8, especially the left and the right guide arrangement 18, 19, may be disposed in a middle portion or a middle region with respect to the depth 13 of the first loading platform 6. The middle portion means a portion in the direction of the depth 13 that extends on both sides for half of the depth 13, respectively starting from this portion on the one hand in the direction of the front loading sill 17 as well as on the other hand in the direction turned away from the front loading sill 17. In this possible arrangement of the two guide arrangements 18, 19, the first loading platform 6, viewed in travel direction of the vehicle 1 as well as in the direction of the depth 13, projects beyond the two guide arrangements 18, 19 in respective directions or sides turned away from one another.

Regardless of this, however, it would also even be possible to dispose the left and the right guide arrangement 18, 19 respectively along the lateral longitudinal rim region of the first loading platform 6 in the direction of its depth 13. However, it would also even be possible to dispose the two guide arrangements 18, 19 in the rear corner region of the first loading platform 6. Furthermore, however, the two guide arrangements 18, 19 could also be disposed in a rear longitudinal rim region of the first loading platform 6 that is spaced apart from the loading sill 17 in the direction of the depth 13.

For execution of the lifting and lowering movement of the first loading platform 6 together with the bearing mechanisms 22, 23 as well as the guide profiles 26, 27, the actuating mechanism 9 of the at least one lifting unit 7 may comprise at least one actuating device 34. The actuating device 34 may be formed, for example, by a drive motor, which actuating device 34 having the different driving means is in driving communication with at least one of the guide profiles 26 and/or 27. Thus, for example, the at least one actuating device 34 could also be formed by a cylinder-piston arrangement, such as, for example, a hydraulic cylinder and/or a pneumatic cylinder, a chain drive, a cable drive, a belt drive or else even a gear arrangement.

In the exemplary embodiment present here, the actuating device 34 is formed by a stepping motor or gear motor, which motor is in driving communication, by means of a toothed gear, not described in more detail, with a toothed rack 35. The at least one toothed rack 35 may be disposed on the guide profile 26, 27 of the guide arrangement 18, 19, in particular be fastened thereon. The at least one actuating device 34 is then in turn disposed on the vehicle body 2 or fastened thereon.

Depending on application situation, the arrangement and design of the at least one actuating device 34 may be chosen on the basis of the dimensions as well as the available space. Thus it would also be possible to dispose the at least one actuating device 34 even within and/or behind the guide arrangements 18, 19, especially their guide profiles 26, 27. Thus a protection of the at least one actuating device 34 may be achieved and, beyond this, that clear space which is provided for loading may also be made even larger.

As already described in the foregoing, the first loading platform 6 is mounted pivotally on the guide profiles 26, 27, with interposition of the bearing mechanism 22, 23. For adjustment of the inclination of the loading platform 6, the pivoting unit 15 may be provided. This comprises at least one pivoting device 36, wherein this is formed by a cylinder-piston arrangement in the present exemplary embodiment. However, other designs of the pivoting device 36 would also be possible. Thus, however, a chain drive, belt drive, cable drive or else even a linear drive would also be conceivable. Independently of this, however, the pivoting device 36 could also be formed directly by a pivoting drive, such as, for example, a pivoting motor, which is disposed or formed in the region of at least one of the pivot axes 24 and/or 25.

In the case of the design of the pivoting device 36 as a cylinder-piston arrangement, a first end 37 of the pivoting device 36 is disposed on the first loading platform 6 or held thereon. A second end 38 of the pivoting device 36 is held or fastened on the guide profile 26, 27 of the guide arrangement 18, 19. Preferably, the first end 37 of the pivoting device 36 on a back side of the first loading platform 6 turned away from a loading side is then disposed or held thereon. In the present exemplary embodiment, the second end 38 of the pivoting device 36 at a second end region 39 of the guide profile 26, 27 spaced apart from the bearing unit 14 is disposed thereon or held thereon. By virtue of the projection of the first loading platform 6 in the direction of its depth 13, an angular position of the pivoting device 36 can be achieved with respect to the vertical alignment of the guide arrangements 18, 19, especially their guide profiles 26, 27.

For better stabilization and avoidance of unilateral loading of the first loading platform 6, it may be advantageous when the pivoting unit 15 comprises two pivoting devices 36, wherein the two pivoting devices 36 can be disposed spaced part from one another in the direction of the width 12 of the loading platform 6. Preferably, these are respectively disposed on the rim side of the first loading platform 6.

The first loading platform 6 with the two guide profiles 26, 27, which preferably are disposed spaced apart from one another in lateral direction of the width 12, forms a U-shaped basic construction when viewed toward the tail of the vehicle 1. The pivoting devices 36 may likewise be preferably disposed in the outer rim region of the first loading platform 6, just as the two guide profiles 26, 27.

Furthermore, it is even possible that, on the side of the guide profile 26, 27 turned away from the loading side, for fastening of the pivoting device or devices 36 on each of the guide profiles 26, 27, a retaining element 40 is disposed in a manner projecting beyond them, in particular is joined to them in stationary manner.

In FIG. 3, it is also indicated that the first loading platform 6, in its starting position in the receiving space 20, may be aligned, especially centered in its relative orientation and position with respect to the vehicle body 2 by means of at least one positioning mechanism 41. In this way, the first loading platform 6 may already be pre-positioned in a predefined position upon the end of the lifting movement. The positioning mechanism 41 may be formed, for example, by interacting wedge faces.

In addition to this, or else even solely on its own, the first loading platform 6 could be held in locked manner in its initial position in the receiving space 20 by means of at least one securing mechanism 42. Thus the securing mechanism 42 could be formed, for example, by an adjustable bolt or pin, if necessary having a leading chamfer, which in the locking position of the securing mechanism 42 is inserted into a locking recess in the loading platform 6.

The at least one positioning mechanism 41 and/or the at least one securing mechanism 42 may be provided at any desired place. In the present exemplary embodiment, both the positioning mechanism 41 and the securing mechanism 42 are disposed on the vehicle body 2 and are situated on the side of the first loading platform 6 turned away from the loading sill 17. It would also be even possible to provide the positioning mechanism 41 and/or the securing mechanism 42 directly in the region of at least one of the guide arrangements 18, 19. In order to achieve even better fixation in position of at least one of the loading platforms 6, 47 during its starting position or transportation position, even several positioning mechanisms 41 and/or securing mechanisms 42 may also be or become provided for each loading platform.

Figure 2:
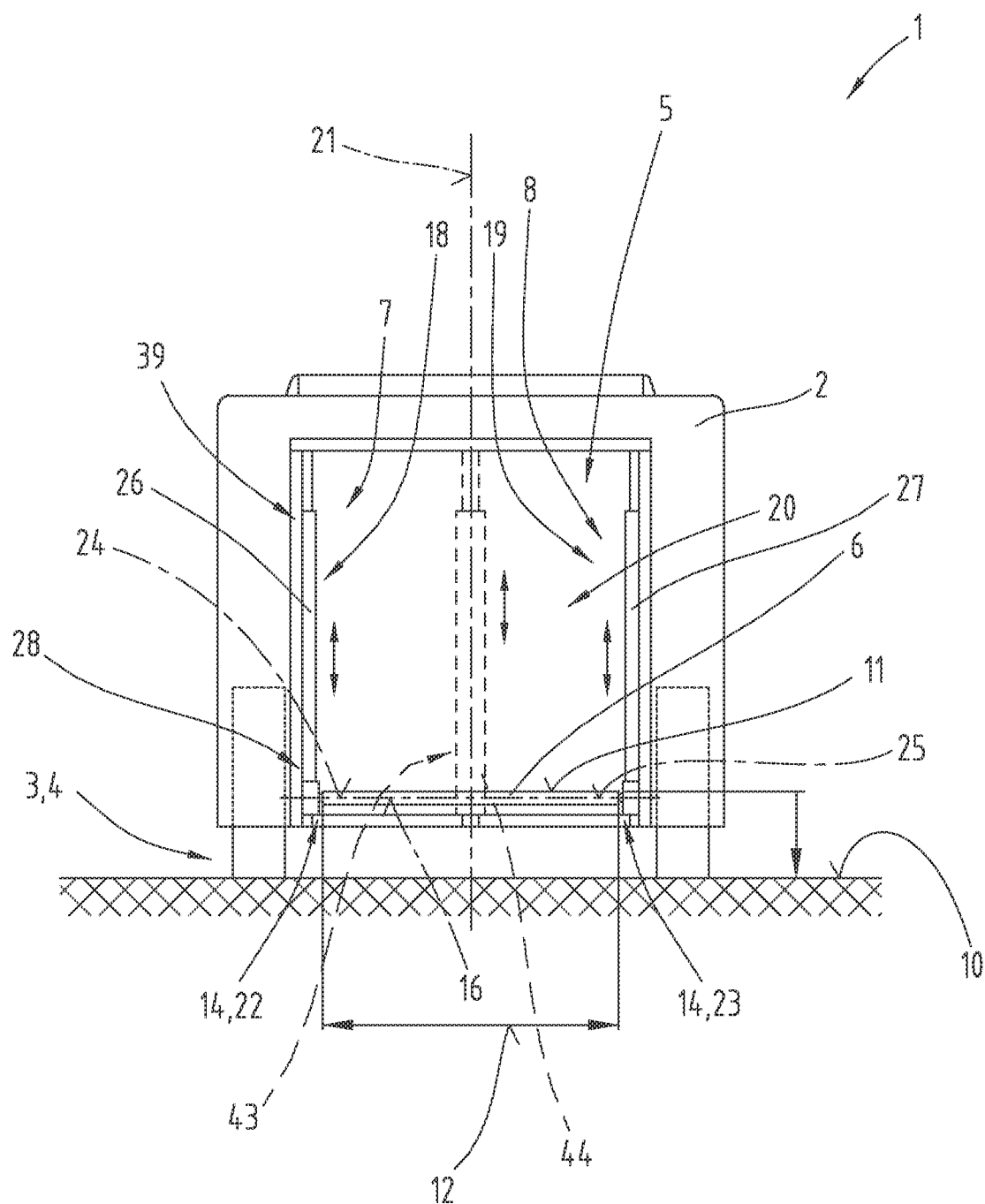
FIG. 2 shows the vehicle according to FIG. 1 in a view of the opened tail.

In FIG. 2, it is also indcted in dashed lines that the guide system 8 may additionally comprise at least one further guide arrangement 43. The further guide arrangement 43 may be designed by analogy with what has been described in the foregoing for the left and right guide arrangements 18, 19. Therefore that detailed description is invoked and reference is made thereto. The further guide arrangement 43 may comprise a further guide profile 44 as well as at least one further longitudinal guide mechanism, not illustrated and described in more detail. The further longitudinal guide arrangement may be designed by analogy with what has already been described in detail in the foregoing.

The further guide arrangement 43 may also be joined in pivotal or articulated manner to the first loading platform 6. This may take place via a further bearing mechanism, not illustrated and described in more detail. Furthermore, it would also be even possible for the lifting unit 7 to be equipped in the region of the further guide arrangement 43 even with a built-in, independent actuating device 34 of the actuating mechanism 9. In this way, an independent adjustment movement (up and down) of the first loading platform 6 may be executed on or by the further guide arrangement 43. In this case, it would be possible as the case may be to dispense with the provision of the pivoting unit 15, especially its pivoting device 36, for the execution of the pivoting movement of the first loading platform 6.

Figure 5:
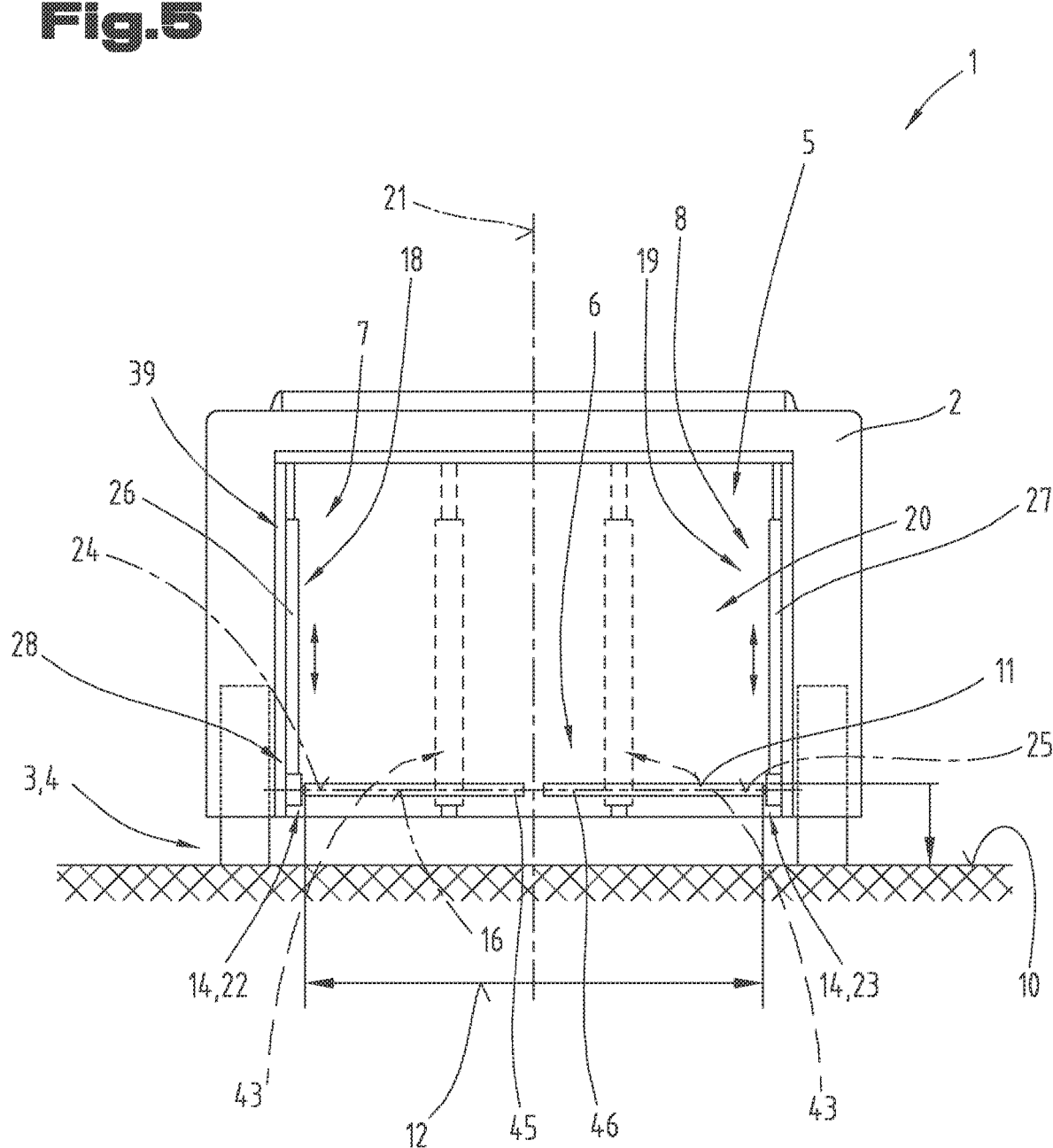
FIG. 5 shows a further possible design of the loading arrangement in a vehicle, in a view of the opened tail.

In FIG. 5, it is also illustrated that the first loading platform 6 is split in the direction of its width 12 and thus may be designed in non-continuous manner. By virtue of this subdivision, a left loading-platform part 45 and a right loading-platform part 46 are formed. If in turn the left guide arrangement 18 and the left bearing mechanism 22 are provided, the left loading-platform part 45 may be mounted pivotally thereon. The same is true by analogy for the right loading-platform part 46. By means of the right bearing mechanism 23, this may be mounted pivotally on the right guide arrangement 19.

Furthermore, each of the loading-platform parts 45 and/or 46 may be in driving communication with a built-in, independent actuating device 34 of the actuating mechanism 9. By virtue of the respective lateral arrangement of the two guide arrangement 18, 19, the respective loading-platform part 45, 46 forms a kind of cantilever arm.

In addition, it would also be even possible to bring each of the loading-platform parts 45, 46 into driving communication with a built-in, independent pivoting device 36 of the pivoting unit 15 or to equip them therewith.

However, it would also be even possible, for at least one of the loading-platform parts 45, 46, to provide, in addition to the left guide arrangement 18 and/or in addition to the right guide arrangement 19, a further guide arrangement 43, described in the foregoing, having the further guide profile 44, as well as at least one further longitudinal guide mechanism, as is indicated by dashed lines. If even each of the guide arrangements 18, 19 and 43 is also provided respectively with a built-in actuating device 34, it would be possible to dispense with the arrangement or the provision of built-in actuating devices 36, and the pivoting unit 15 could be formed by the actuating devices 34.

Figure 6:
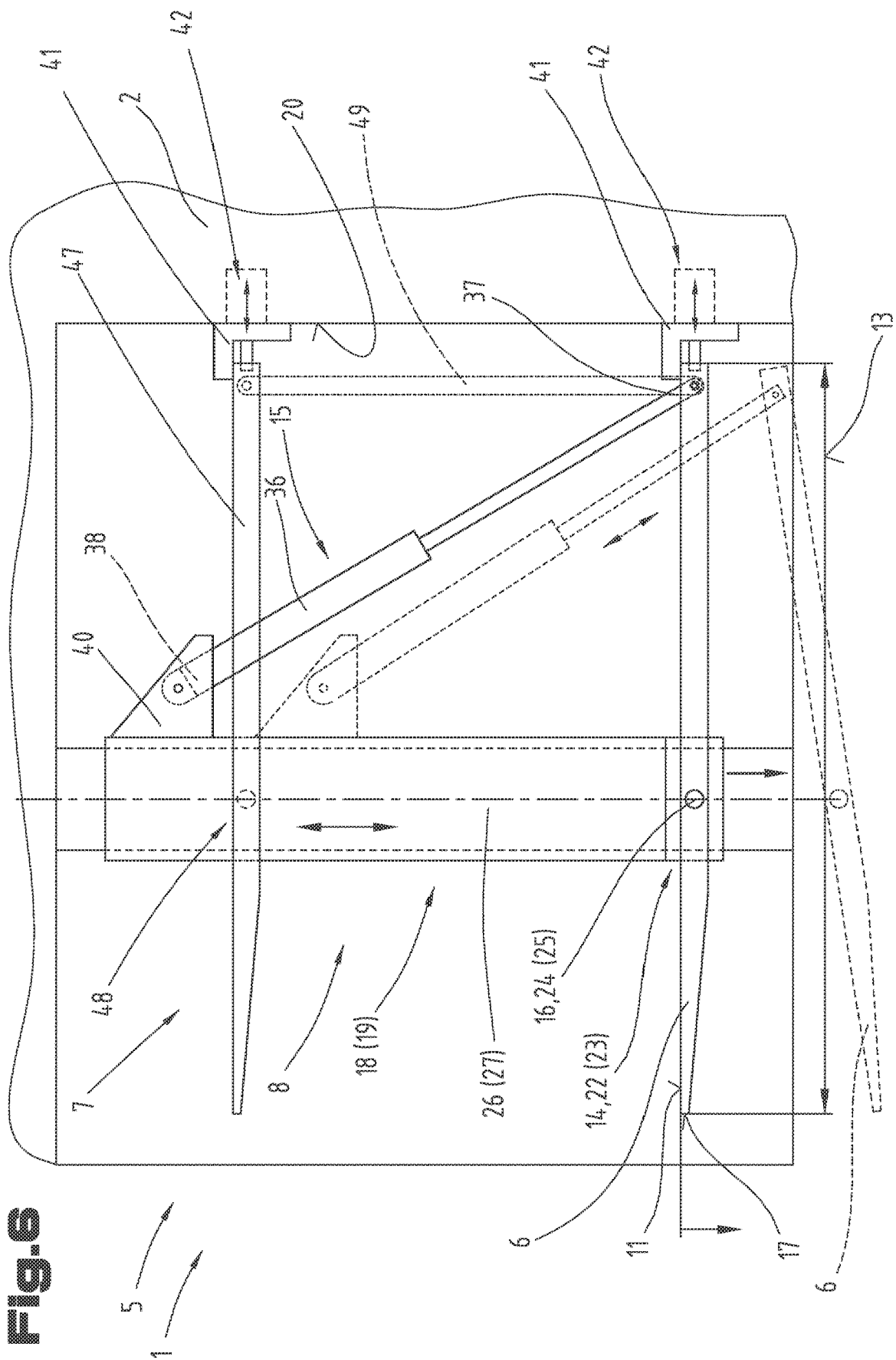
FIG. 6 shows a detail of a further possible loading arrangement, in a view of the components of the lifting unit, bearing unit and pivoting unit disposed on the left in travel direction, having an additional loading platform.

A further design, which if necessary is independent, of a part of the loading arrangement 5, is shown in FIG. 6, wherein once again like reference symbols are used for like structural parts, as in the foregoing FIG. 1 to FIG. 5. To avoid unnecessary repetitions, the detailed description in the foregoing FIG. 1 to FIG. 5 is invoked and reference is also made thereto. The design illustrated here corresponds in principle to that which has already been described in detail in FIG. 3. For the sake of better clarity, the illustration of the actuating mechanism 9, wherein at least one actuating device 34 is provided, has been omitted. Once again, the lowered and pivoted position of the first loading platform 6 is also indicated here by dashed lines.

Thus it is also shown or provided here that the loading arrangement 5 may comprise at least one further loading platform 47. The at least one further loading platform 47 is disposed spaced apart in vertical direction from the first loading platform 6 on one of the guide profiles 26, 27. Thus it may be a stationary, immobile arrangement or retaining means.

In addition, it would also be even possible to mount the at least one further loading platform 47 pivotally on one of the guide profiles 26 and/or 27 by means of a further bearing mechanism 48 as a constituent of the bearing unit 14. If the at least one further loading platform 47 is also mounted pivotally, it may be coupled with the first loading platform 6 by means of a coupling element 49. As an example, the coupling element may be formed by a bar, a cable, a chain, a belt or the like.

It would also be even conceivable that, on each of the guide profiles 26 and/or 27, several further loading platforms 47 are disposed thereon and if applicable are also pivotally mounted.

The exemplary embodiments show possible embodiment variants, wherein it must be noted at this place that the invention is not restricted to the specially illustrated embodiment variants of the same, but to the contrary diverse combinations of the individual embodiment variants with one another are also possible and, on the basis of the teaching of the technical handling by the subject invention, this variation possibility lies within the know-how of the person skilled in the art and active in this technical field.

The scope of protection is defined by the claims. However, the description and the drawings are to be used for interpretation of the claims. Individual features or combinations of features from the shown and described different exemplary embodiments may represent inventive solutions that are independent in themselves. The task underlying the independent inventive solutions may be inferred from the description.

All statements about value ranges in the description of the subject matter are to be understood to the effect that they jointly comprise any desired and all sub-ranges therefrom, e.g. the statement 1 to 10 is to be understood to the effect that all sub-ranges, starting from the lower limit 1 and the upper limit 10 are jointly comprised, i.e. all sub-ranges begin with a lower range of 1 or greater and end at an upper limit of 10 or smaller, e.g. 1 to 1.7, or 3.2 to 8.1, or 5.5 to 10.

Finally, it must be pointed out, as a matter of form, that some elements have been illustrated not to scale and/or enlarged and/or reduced for better understanding of the structure.

LIST OF REFERENCE NUMERALS

1 Vehicle
2 Vehicle body
3 Front-wheel pair
4 Rear-wheel pair
5 Loading arrangement
6 Loading platform
7 Lifting unit
8 Guide system
9 Actuating mechanism
10 Contact surface
11 Loading surface
12 Width
13 Depth
14 Bearing unit
15 Pivoting unit
16 Pivot axis
17 Loading sill
18 Left guide arrangement
19 Right guide arrangement
20 Receiving space
21 Vehicle middle plane
22 Left bearing mechanism
23 Right bearing mechanism
24 Left pivot axis
25 Right pivot axis
26 Left guide profile
27 Right guide profile
28 First end region
29 Left longitudinal guide mechanism
30 Right longitudinal guide mechanism
31 Base frame
32 Guide roller
33 Guide roller
34 Actuating device
35 Toothed rack
36 Pivoting device
37 First end
38 Second end
39 Second end region
40 Retaining element
41 Positioning mechanism
42 Securing mechanism
43 Further guide arrangement
44 Further guide profile
45 Left loading-platform part
46 Right loading-platform part
47 Further loading platform
48 Further bearing mechanism
49 Coupling element

The invention claimed is:
1. A vehicle comprising
a vehicle body,
at least one front-wheel pair and at least one rear-wheel pair,
at least one loading arrangement, wherein the at least one loading arrangement comprises a first loading platform and at least one lifting unit having a guide system and an actuating mechanism, wherein, via the actuating mechanism, the first loading platform is liftable and lowerable relative to the vehicle body, and the first loading platform forms a loading surface having a width and a depth, and wherein the first loading platform has an upper starting position and in the upper starting position is horizontally aligned when the vehicle body has a horizontal alignment,
wherein the at least one loading arrangement is received and disposed within the vehicle body,
wherein the guide system is designed as a longitudinal guide system,
wherein the guide system comprises a left guide arrangement and a right guide arrangement, and the two guide arrangements are disposed respectively on both sides of the first loading platform in the direction of the width of the first loading platform, wherein the left guide arrangement and the right guide arrangement of the guide system are disposed in a middle portion with respect to the depth of the first loading platform, wherein the left guide arrangement of the guide system has a left guide profile and the right guide arrangement of the guide system has a right guide profile, wherein the at least one loading arrangement comprises a bearing unit, which bearing unit defines a pivot axis, the bearing unit comprises a left bearing mechanism and a right bearing mechanism, and the left bearing mechanism defines a left pivot axis and the right bearing mechanism defines a right pivot axis, and the left pivot axis and the right pivot axis are aligned exactly with one another as well as together form the pivot axis of the bearing unit, the first loading platform is mounted on the bearing unit in a manner pivotable around the pivot axis, the bearing unit is disposed on the guide system and in this case the left bearing mechanism of the bearing unit is joined to the left guide profile and the right bearing mechanism of the bearing unit is joined to the right guide profile, the left and the right bearing mechanism of the bearing unit and the first loading platform mounted thereon are disposed in a lower first end region of the guide profiles that is able to be turned toward a contact surface of the vehicle, the at least one loading arrangement further comprises a pivoting unit, the first loading platform is in driving communication with the pivoting unit, wherein via the pivoting unit the first loading platform, in a relative position with respect to the guide system, is adjustable around the pivot axis of the bearing unit, the pivoting unit comprises at least one pivoting device, and a first end of the pivoting device is held on the first loading platform, and a second end of the pivoting device is held on the guide profile of the guide arrangement, the first end of the pivoting device, on a back side of the first loading platform turned away from a loading side, is held thereon, and the second end of the pivoting device, on a second end region of the guide profile spaced apart from the bearing unit, is disposed thereon, wherein the loading arrangement comprises at least one further loading platform disposed spaced apart in a vertical direction from the first loading platform on one of the left and the right guide profiles, and wherein the at least one further loading platform is mounted pivotally on one of the left and the right guide profiles via a further bearing mechanism of the bearing unit.

2. The vehicle according to claim 1, wherein the loading surface of the first loading platform, in the upper starting position, has a horizontal alignment when the vehicle body has the horizontal alignment, and wherein after the loading surface is pivoted to the back side turned away from the vehicle body, the loading surface is aligned in a downward manner.

3. The vehicle according to claim 1, wherein the loading arrangement comprises at least one positioning mechanism and/or one securing mechanism and at least the first loading platform is positioned and/or held in the upper starting position via the positioning mechanism and/or via the securing mechanism in the upper starting position relative to the vehicle body.

4. The vehicle according to claim 1, wherein the guide system comprises at least one further guide arrangement and the at least one further guide arrangement is joined pivotally to the first loading platform.

5. The vehicle according to claim 4, wherein the further guide arrangement is aligned in a manner running in the vertical direction when the vehicle body has a horizontal alignment.

6. The vehicle according to claim 1, wherein the guide system is aligned in a manner running in a vertical direction when the vehicle body has a horizontal alignment.

7. The vehicle according to claim 6, wherein the left guide arrangement and the right guide arrangement are aligned in a manner running in the vertical direction when the vehicle body has a horizontal alignment.

8. The vehicle according to claim 7, wherein the left guide profile and the right guide profile are aligned in a manner running in the vertical direction when the vehicle body has a horizontal alignment.

9. The vehicle according to claim 1, wherein the left guide arrangement comprises at least one left longitudinal guide mechanism, wherein the right guide arrangement comprises at least one right longitudinal guide mechanism, and wherein the left guide profile is guided on the at least one left longitudinal guide arrangement and the right guide profile is guided on the at least one right longitudinal guide arrangement.

10. The vehicle according to claim 1, wherein the at least one further loading platform is coupled with the first loading platform via a coupling element.

11. The vehicle according to claim 1, wherein the vehicle is selected from the group consisting of an emergency vehicle, a fire truck, a public works vehicle, and a transportation vehicle.

12. The vehicle according to claim 1, wherein the pivoting device further comprises at least one member selected from the group consisting of a cylinder-piston arrangement, a chain drive, a belt drive, a cable drive and a linear drive.

* * * * *